Jan. 26, 1971    W. D. SCHMIDT    3,557,642
MACHINE TOOL

Filed July 22, 1968    4 Sheets-Sheet 1

WILLIAM D. SCHMIDT
INVENTOR

BY *Norman S. Blodgett*

ATTORNEY

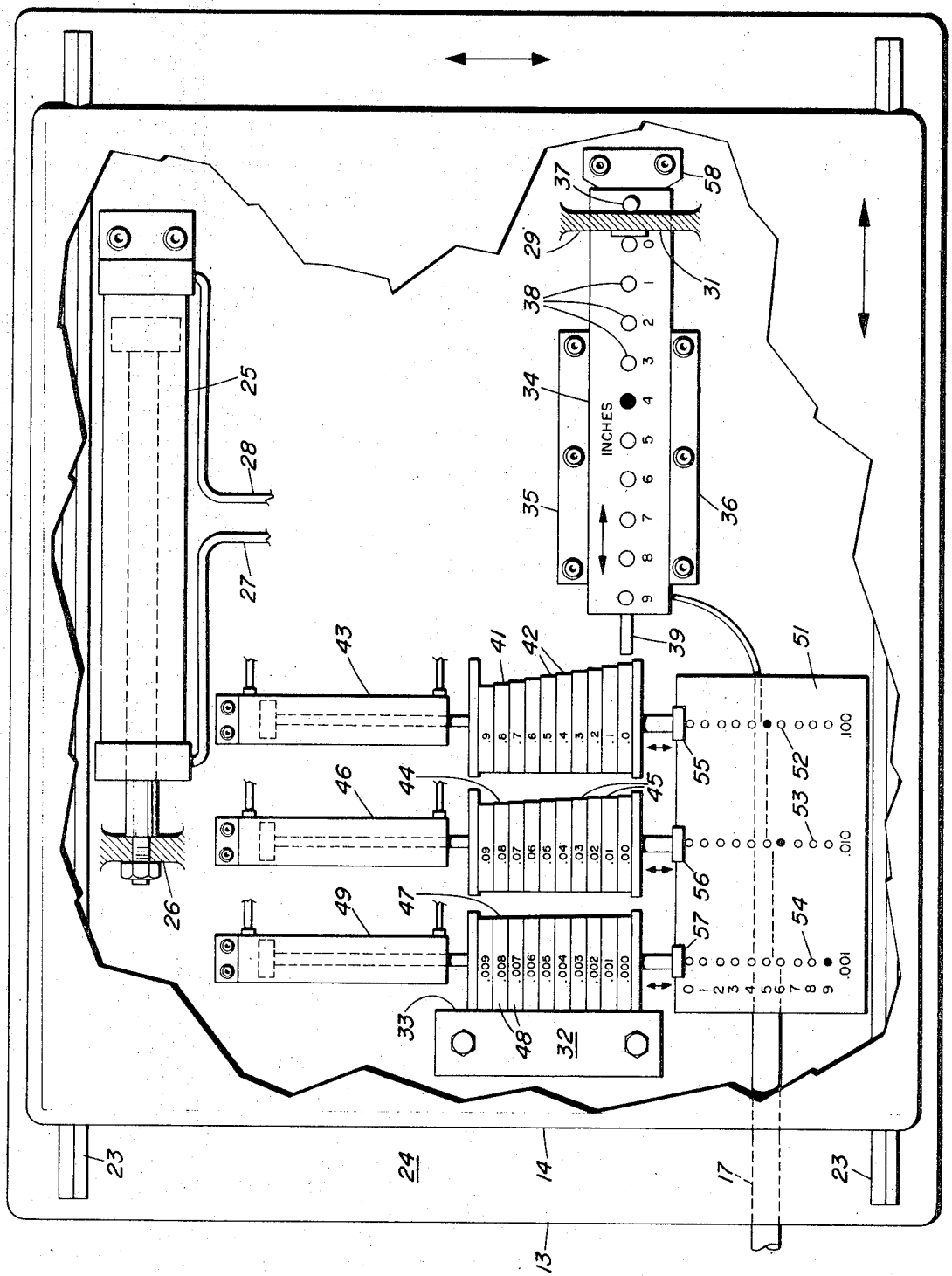

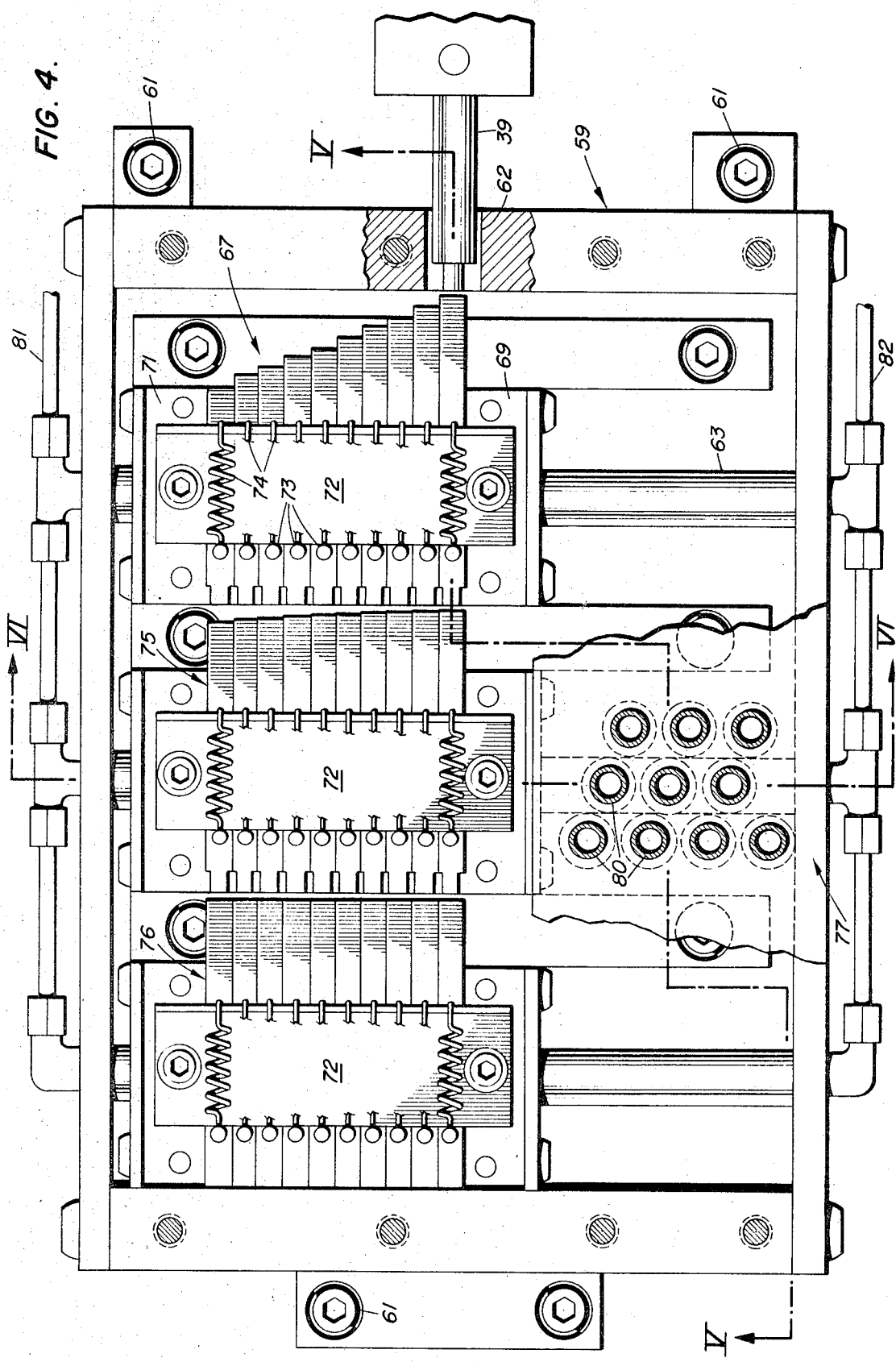

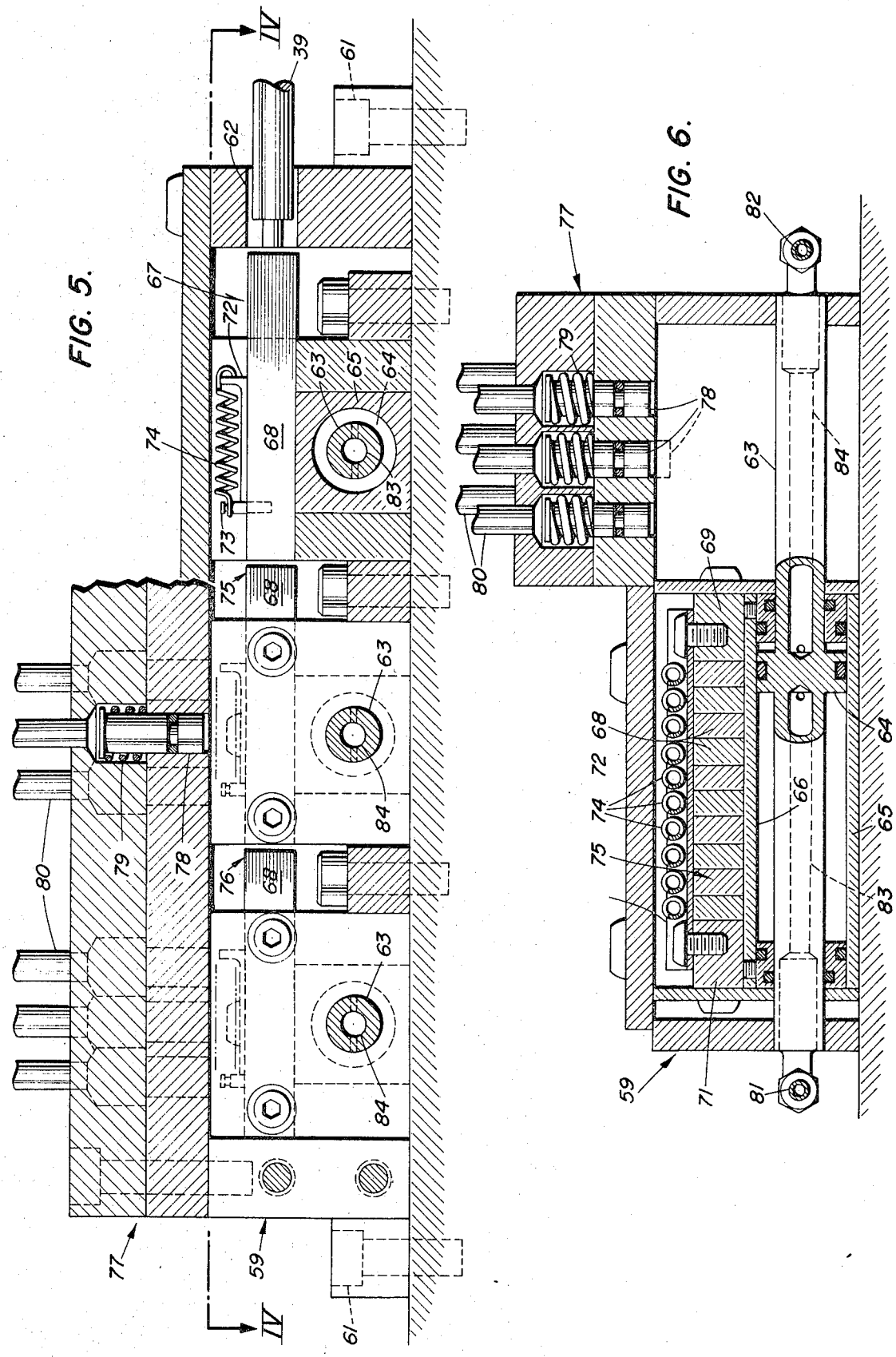

United States Patent Office 3,557,642
Patented Jan. 26, 1971

3,557,642
MACHINE TOOL
William D. Schmidt, 20 Briarcliff Lane,
Holden, Mass. 01520
Filed July 22, 1968, Ser. No. 746,347
Int. Cl. B23b 39/06
U.S. Cl. 77—64                8 Claims

ABSTRACT OF THE DISCLOSURE

This invention has to do with a machine tool and, more particularly, to a table position control consisting of gages which are arranged in a predetermined manner to stop the table at an accurately-determined position.

BACKGROUND OF THE INVENTION

In the design of machine tools, it is common practice to provide an automatic control to locate the cutting accurately relative to the workpiece on which a machining operation is to be performed. In the past, these controls have been complicated and expensive. Often, too, they have been electrically operated, rather than hydraulic or pneumatic, and have required maintenance by highly skilled workers. These and other difficulties experienced with the prior art devices have been obviated in a novel manner by the present invention.

It is, therefore, an outstanding object of the invention to provide a machine tool having automatic tool-workpiece location with excellent repeatability.

Another object of this invention is the provision of a machine table position control which is operated entirely by fluid pressure, rather than by electricity.

A further object of the present invention is the provision of a table position control which is simple and rugged in construction, which is inexpensive to manufacture, and which is capable of a long life of useful service with a minimum of maintenance.

It is another object of the instant invention to provide a table position control that can be installed and maintained without the use of skilled workers.

With these and other objects in view, as will be apparent to those skilled in the art, the invention resides in the combination of parts set forth in the specification and covered by the claims appended hereto.

SUMMARY OF THE INVENTION

In general, the invention has to do with a machine tool having a base, having a table mounted on the base for linear sliding motion relative thereto, having an actuator connecting the base and the table to produce the said motion, having a stop mounted on the table and having a finger extending in the direction of the motion, and having a plurality of arrays of gages mounted on the base; the arrays are mounted side-by-side transversely of the direction of motion, and the gages in a given array are mounted side-by-side for individual sliding in the said direction. The gages in a given array differ from one another by predetermined increments.

BRIEF DESCRIPTION OF THE DRAWINGS

The character of the invention, however, may be best understood by reference to one of its structural forms, as illustrated by the accompanying drawings, in which:

FIG. 3 is a plan, somewhat schematic view of the machine tool taken on the line III—III of FIG. 1, FIG. 4 is a plan view of a modified form of a portion of the machine tool, taken on the line IV—IV of FIG. 5, FIG. 5 is a front elevation of the portion taken on the line V—V of FIG. 4, and FIG. 6 is a sectional view of the portion taken on the line VI—VI of FIG. 4.

DESCRIPTION OF THE PREFERRED EMBODIMENT

Figure 1:
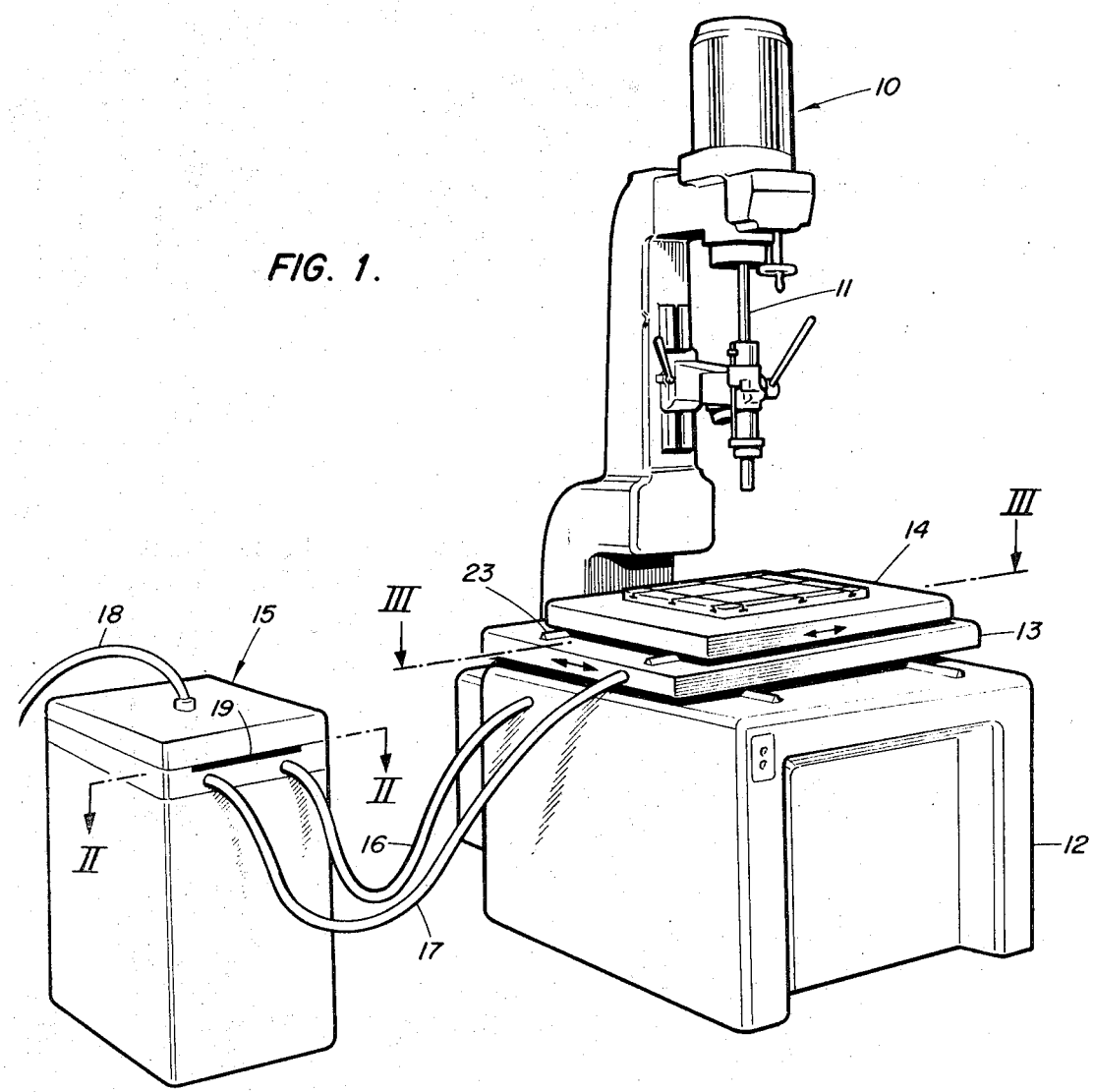
FIG. 1 is a perspective view of a machine tool embodying the principles of the present invention.

Referring first to FIG. 1, wherein are best shown the general features of the invention, the machine tool, indicated generally by the reference numeral 10, as having a vertical spindle 11 overlying a base 12 on which are mounted a first table 13 and a second table 14. The first table is mounted on ways for forward-and-rearward movement over the flat upper surface of the base; the second table is mounted on the flat upper surface of the first table for movement in the side-to-side direction. A control console 15 is located beside the base and conduit bundles or cables 16 and 17 join the console to the second table 14 and first table 13, respectively. A conduit 18 enters the top of the console to supply it with a pressure fluid such as pressure air. A slot 19 is provided at the front of the console for the introduction of a perforated control card, not shown; it will be understood that a punched tape or similar control medium can be used.

Figure 2:
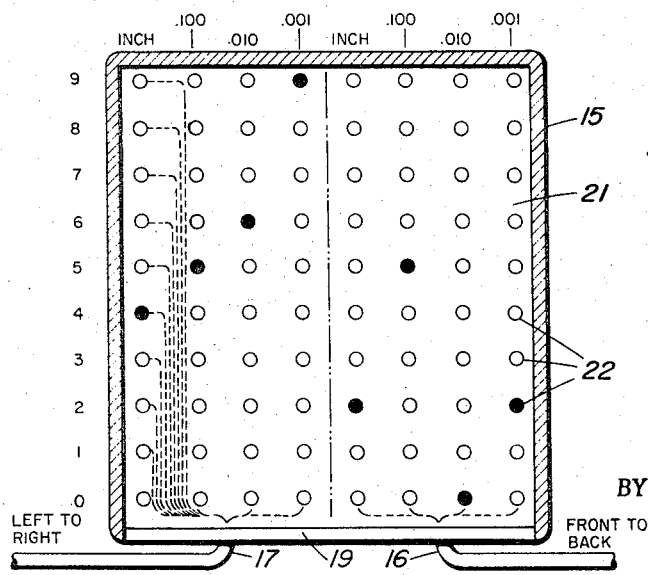
FIG. 2 is a sectional view of a portion of the machine tool taken on the line II—II of FIG. 1.

FIG. 2 shows the interior of the console 15 and, particularly, a flat plate 21 having a grid of apertures 22 arranged in the preferred embodiment in eight rows of ten apertures each. The apertured card allows pressure air from the conduit 18 to pass through to a tube or conduit connected to each aperture, the conduits being bundled together to form the cables 16 and 17. The forty apertures at the right side associated with the cable 16 control the front-to-back position of the first or lower table 13, while the forty apertures at the left side operate through the cable 17 to control the left-to-right position of the second or upper table 14. The workpiece is fastened to the upper surface of the upper table, so that these positions determine its position relative to the tool spindle 11.

In FIG. 3 it can be seen that the table 14 slides on ways 23 extending upwardly from the flat upper surface 24 of the lower table 13. An actuator such as a pneumatic cylinder 25 is bolted to the table 13 and the piston rod is connected to a flange 26 extending downwardly from the underside of the table 14. Suitable conduits 27 and 28 are attached to the opposite ends of the cylinder to supply it on occasion with pressure fluid to move the table 14 along the ways. In the preferred embodiment, the stroke of the cylinder is 10 inches.

Extending outwardly from the underside of the table 14 is another flange 29 having a vertical plane surface 31. Extending upwardly from the upper surface of the table 13 is a stop bar 32 having a plane vertical surface 33; the surfaces 31 and 33 face one another, are parallel and extend at right angles to the axis of the cylinder, i.e., the direction of table motion. The position of the table relative to the spindle axis is determined by the distance between these surfaces, and it is the purpose of the control apparatus to regulate this distance very accurately. An inch bar 34 rests on the surface 24 and is guided by parallel guide bars 35 and 36 which restrain the sliding movement of the inch bar to motion in the direction of table motion. At the right-hand end of the inch bar is an upwardly-extending peg 37; the upper surface of the inch bar is slightly below the lower edge of the flange 29, but the peg 37 extends high enough to be contacted by the flange. A series of ten pegs 38 are arranged along the guide bar exactly one-inch apart, but each peg is normally located in an inoperative position with its upper end recessed below the upper surface of the guide bar 34; a peg 38 can be raised into an upper, operative position by the introduction of pressure fluid. In the upper position, the peg is high enough to be engaged by the face or surface 31 of the flange 29 on the table 14. Extending from the left-hand end of the inch bar is a thin finger 39.

Arranged in front of the inch bar 34 is an array 41 of ten gage bars 42, each bar being 0.1 inch less than the one beside it as one progresses from the front to the back. An actuator such as apneumatic cylinder 43 is provided to move the array to various positions transversely of the direction of table motion. A similar array 44 of ten gage bars 45 differing by .01 inch increments extends across the line of action of the inch bar 34 and are moved in a body laterally by a pneumatic cylinder 46. Finally, an array 47 of ten gage bars 48 which are stepped in length by .001 inch increments also extend across the line adjacent the bar 32 and are moved by a cylinder 49. A peg plate 51 is provided with three rows 52, 53, and 54 aligned with plungers 55, 56, and 57 which are associated and move with the arrays 41, 44, and 47, respectively. The pegs in the rows are normally recessed below the surface of the plate 51, but one peg in each row is movable by pneumatic pressure arriving through the cable 17 to an upwardly-extending position where it can be contacted by one of the plungers 55, 56, and 57.

The operation of the machine tool will now be readily understood in view of the above description. With the machine tool 10 energized and the spindle 11 rotating, the table 14 is at its extreme right-hand position along the X-axis with the flange 29 resting against the fixed peg 37 and the inch bar 34 backed up against a transverse stop bar 58 bolted to the table 13. Each of the gage bars 42, 45, and 48 is spring-biased to a starting position similar to that shown in the drawing with the bars in each array neatly lined up. The table 13 is in its rearwardmost position along the Y axis relative to the base 12, so that the workpiece mounted on the upper surface of the table 14 is in "zero" position relative to the spindle. A punched card carrying the "address" of the point at which the next machining operation is to be carried out is inserted in the slot 19 of the control console 15. It has holes punched in its corresponding to this new position. Let us assume that the new position is to be located 4.569 inches along the X-axis and 2.502 inches along the Y-axis from point "zero." The card would have holes punched corresponding to the holes colored in solid black in FIG. 2. Then, pressure air is introduced into the console through the conduit 18. This pressure air passes through the holes in the card into the conduits associated with them; these pressure impulses pass through the cables 16 and 17 to the base 12 (to control the movement of the table 13 along the Y-axis) and the table 13 (to control the movement of the table 14 along the X-axis). The pressure air causes the black peg 38 on inch gage to rise and the black pegs 52, 53, and 54 on the plate 51. As soon as time enough has passed to raise the four pegs, air under pressure is introduced into the cylinders 43, 46, and 49, so that the arrays 41, 44, and 47 are moved forwardly. Eventually, the plunger 55 on the array 41 contacts the black peg in the row 52, while the plunger 56 of the array 44 contacts the black peg in the row 53 and the plunger 57 of the array 47 contacts the black peg of the row 54. This lines up the .5 inch gage bar, the .06 inch gage bar, and the .009 inch gage bar with the finger 39 of the inch bar. As soon as this adjustment of the arrays has been completed, pneumatic fluid is introduced into the conduit 28 of the cylinder 25 and the conduit 27 is connected to drain. The table 14 starts to the left, the flange 29 leaving the fixed peg 37 behind. Eventually, as the table moves to the left, the front face or surface 31 of the table engages the 4.0 inch peg 38. The table continues to move to the left, but now it carries the inch bar 34 with it. Eventually, the finger 39 contacts the 0.5 inch gage bar 42 in the array 41 and carries it along with it. Then, this gage bar, in turn, engages the .06 inch gage bar 45 in the array 44, so that it moves with the table. The gage bar 45 then engages the .009 inch gage bar 48 in the array 47, so that this last bar moves with the table until the gage bar 48 contacts and is stopped by the stop bar 32. The pneumatic pressure in the cylinder 25 presses the flange 29 of the table 14, the portion of the inch bar 34 to the left of the 4.0 inch peg 38, and the gage bars 42, 45, and 48 together tightly. The table 14 has then moved 4.569 inches along the X-axis from the zero point. A similar operation has moved the table 14 2.502 inches forwardly from the zero point. The spindle and its tool can be advanced toward the workpiece and the machining operation performed.

When the machining operation has been completed, the pneumatic fluid to the cylinder 25 is reversed to return the table to zero. At the same time, the cylinders 43, 46, and 49 are reversed to bring the arrays back to the point where the plungers are clear of the "0" pegs in their respective rows; the flange 29 engages the fixed peg 37 and carries it to the right into contact with the stop bar 58. The table is now back at position "zero" and the equipment is ready for the next setting. If the control console were reading a punched tape instead of individual cards, this series of alternate table-location and machining operation cycles continues automatically until the workpiece is finished. Although the machine tool is described as a single-spindle drill press for use, for instance, in drilling a large number of holes in a plate, it will be understood that table movement could be used anywhere that accurate table positioning is necessary. For instance, it can be used with a tool changer apparatus for performing a series of drilling, counterboring, boring, and tapping operations.

The arrangement of arrays of gage bars and their related equipment are shown more or less schematically in FIG. 3. However, FIGS. 4, 5, and 6 show the details of a practical design that has worked well in practice. A box-like enclosure 59 is attached to be fastened to the upper flat surface of the table 14 by means of bolts 61. An aperture 62 in an end wall receives the finger 39 associated with the inch bar 34. Extending across the bottom of the enclosure is a fixed piston rod 63 carrying a central fixed piston 64. Slidably mounted on the piston rod and piston is a cylinder 65 to which is attached a horizontal plate 66 on which rests an array 67 of gage bars 68. The gage bars are mounted for individual sliding motion over the upper surface of the plate 66 between two end blocks 69 and 71. Finally, a strap 72 is bolted to the end blocks and engages the upper surfaces of the gage bars to hold them in place. Each gage bar 68 has a vertical peg 73 from which a light coil spring 74 extends to a portion of the strap. This spring acts to return each gage bar to a normal, inoperative position after it has been engaged by the finger 39 and slid to the left during a table-positioning cycle. Two other arrays 75 and 76 are provided within the enclosure, each having its own operating piston-and-cylinder arrangement. In addition, a superstructure, such as the superstructure 77 associated with the array 67, is mounted on the enclosure in association with each array in such a way that the array can slide under it. In the superstructure 77 are mounted a series of pegs 78, each of which is normally maintained in a raised position by a coil spring 79, but which can be extended to a lower, dotted position where it can be engaged by the array by pressure air arriving in a conduit 80. There are ten pegs associated with each array and, if space is limited, they can be arranged in a zigzag pattern instead of being arranged in the type of straight line or row that is shown in FIG. 3. Suitable pneumatic fluid conduits 81 and 82 are connected through passages 83 and 84, respectively, to introduce fluid under pressure to the cylinder 65 on one side of the piston 64 and remove it from the other side.

It is obvious that minor changes be made in the form and construction of the invention without departing from the material spirit thereof. It is not, however, desired to confine the invention to the exact form herein shown and described, but it is desired to include all such as properly come within the scope claimed.

The invention having thus described, what is claimed as new and desired to secure by Letters Patent is:

1. A machine tool, comprising
   (a) a first member,
   (b) a second member mounted on the first member for linear sliding motion relative thereto,
   (c) an actuator connecting the first and second members to produce the said motion,
   (d) a stop mounted on the second member and having a finger extending in the direction of the motion,
   (e) a plurality of arrays of gages mounted on the first member, the arrays being mounted side-by-side transversely of the said direction and the gages in a given array being mounted side-by-side and individually slidable in the said direction, the gages in a given array differing from one another by predetermined increments.

2. A machine tool as recited in claim 1, wherein each array is provided with its own actuator to move it independently of the other arrays in a direction transversely of the said direction to bring one of its gages into alignment with the finger.

3. A machine tool as recited in claim 2, wherein a row of stops is arranged in the general path of motion of each array, each stop being normally located in an inoperative position where it is not contacted by the array during its transverse motion, but being energizable by fluid pressure to an operative position where it is contacted by the array to determine the amount of its motion.

4. A machine tool as recited in claim 1, wherein the stop is mounted on the first member for sliding motion in the said direction, wherein the stop is provided with a series of accurately-located gage buttons, each button being normally located in an inoperative position, but being movable by fluid pressure to an operative position where it can be engaged by a portion of the second member.

5. A machine tool as recited in claim 1, wherein each gage is independently slidable relative to the other gages in its array, but is spring-biased to return to an original position when not maintained in another position by the action of the finger.

6. A machine tool as recited in claim 1, wherein the gages in one array differ in length by increments of 0.1 inch, in a second array by .01 inch, and in a third array by .001 inch, and wherein the gage buttons on the stop are located at intervals of 1.0 inch.

7. A machine tool as recited in claim 2, wherein an abutment associated with the first member against which abutment the finger drives a series of gages one from each array.

8. A machine tool as recited in claim 3, wherein a control allows fluid pressure to be supplied to one only of the gage buttons and one only of the stops in each row associated with an array, so that the table can contact a predetermined gage button and the finger can, in turn, drive one predetermined gage of each array toward the abutment.

References Cited
UNITED STATES PATENTS

| | | | |
|---|---|---|---|
| 3,242,772 | 3/1966 | Grimland et al. | 77—32.2 |
| 2,649,000 | 8/1953 | Bice | 77—64 |

FRANCIS S. HUSAR, Primary Examiner

U.S. Cl. X.R.

77—32.2